(12) United States Patent
Motoyama

(10) Patent No.: US 9,057,428 B2
(45) Date of Patent: Jun. 16, 2015

(54) TRANSAXLE DEVICE

(71) Applicant: MITSUBISHI JIDOSHA KOGYO KABUSHIKI KAISHA, Tokyo (JP)

(72) Inventor: Sumio Motoyama, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/456,109

(22) Filed: Aug. 11, 2014

(65) Prior Publication Data

US 2015/0080162 A1 Mar. 19, 2015

(30) Foreign Application Priority Data

Sep. 13, 2013 (JP) ................................ 2013-190718

(51) Int. Cl.
*B60K 1/00* (2006.01)
*F16H 37/08* (2006.01)
*F16H 61/04* (2006.01)
*B60K 6/36* (2007.10)
*B60K 6/48* (2007.10)

(52) U.S. Cl.
CPC ........ *F16H 37/0806* (2013.01); *F16H 61/0403* (2013.01); *Y10S 903/919* (2013.01); *F16H 2200/0008* (2013.01); *F16H 2061/0407* (2013.01); *B60K 6/36* (2013.01); *B60K 6/48* (2013.01); *B60K 2006/4816* (2013.01)

(58) Field of Classification Search
CPC ............ B60K 6/36; B60K 6/40; B60K 6/405; B60K 6/442
USPC ......................................................... 180/65.6
See application file for complete search history.

(56) References Cited

U.S. PATENT DOCUMENTS

| 8,869,653 B2 * | 10/2014 | Fujita et al. .................. 74/730.1 |
| 2002/0084118 A1 * | 7/2002 | Esaki ........................... 180/65.2 |
| 2008/0076616 A1 * | 3/2008 | Kidokoro et al. ................. 475/5 |
| 2011/0036652 A1 * | 2/2011 | Honda et al. ............... 180/65.25 |
| 2013/0288854 A1 * | 10/2013 | Kobayashi ........................ 477/5 |

FOREIGN PATENT DOCUMENTS

JP 4958126 B2 6/2012

* cited by examiner

*Primary Examiner* — Derek D Knight
(74) *Attorney, Agent, or Firm* — Birch, Stewart, Kolasch & Birch, LLP

(57) ABSTRACT

A center distance D1 from a motor shaft connected to an electric motor and a generator shaft connected to a generator to a clutch shaft including a wet multiple disc clutch is set longer than a distance Dm from the axial center of the electric motor, that is, the axial center of the motor shaft to the outermost circumference of a housing, which houses the electric motor.

20 Claims, 4 Drawing Sheets

TRANSAXLE DEVICE

BACKGROUND OF THE INVENTION

1. Field of the Invention

The present invention relates to a transaxle device and, more particularly, to the structure of the transaxle device.

2. Description of the Related Art

A vehicle including a plurality of traveling driving sources such as a hybrid vehicle or a plug-in hybrid vehicle has conventionally been known. The hybrid vehicle or the plug-in hybrid vehicle includes an engine and a motor as the traveling driving sources. As such a hybrid vehicle or a plug-in hybrid vehicle, a vehicle has been developed that is capable of driving in a parallel driving mode for simultaneously driving wheels with driving forces of both of the engine and the motor.

As the hybrid vehicle or the plug-in hybrid vehicle, for example, there is a vehicle in which the engine and the motor are arranged side by side in the left-right direction in a front part of the vehicle and drive a drive shaft connected to front wheels via a transaxle device.

For example, a configuration has been known in which an engine shaft arranged coaxially with an engine, a generator shaft to which a motor and a generator are connected, and an idler shaft connected to a drive shaft via a differential gear are arranged in parallel to one another (see Japanese Patent No. 4958126). In the generator shaft, an inner circumferential shaft to which the generator is connected and an outer circumferential shaft to which the motor is connected are integrally configured to be capable of relatively rotating. The inner circumferential shaft is driven by the engine. The engine shaft includes a clutch that connects and disconnects transmission of power of the engine that drives the drive shaft via the idler shaft and the differential gear.

In a series mode for generating electric power in the generator with the power of the engine and causing the vehicle to travel with the power of the motor, the clutch included in the engine shaft is disconnected, the generator is driven by the power of the engine via the engine shaft and the inner circumferential shaft, and the drive shaft is driven by the power of the motor via the differential gear, the idler shaft, and the outer circumferential shaft. In a parallel mode for causing the vehicle to travel with the power of the engine and the power of the motor while driving the generator with the power of the engine to generate electric power, the clutch included in the engine shaft is connected to transmit the power of the engine to the drive shaft via the engine shaft, the idler shaft, and the differential gear.

In a driving device for a hybrid vehicle disclosed in the patent publication, the clutch is disposed in the engine shaft provided between an output gear for transmitting the power of the engine to the inner circumferential shaft and an output gear for transmitting the power of the engine to the idler shaft.

However, when a clutch is disposed between the output gears included in the engine shaft in this way, since a mounting space for the clutch is reduced, a freedom of design of the clutch decreases. Further, the engine shaft is long in the axial direction and the transaxle device is long in the engine shaft direction. Therefore, for example, in a vehicle in which an output shaft of the engine extends in the vehicle width direction of the vehicle, since the transaxle device is long in the vehicle width direction, mountability is undesirably deteriorated.

SUMMARY OF THE INVENTION

Therefore, it is an object of the present invention to provide a transaxle device that can improve mountability on a vehicle.

In order to attain the object, a transaxle device according to the present invention includes: a first driving shaft arranged coaxially with a crankshaft of an engine, which is mounted on a vehicle, and connected to the crankshaft; a first output shaft arranged in parallel to the first driving shaft and configured to transmit power to a traveling driving shaft of the vehicle via a differential gear; a second output shaft arranged in parallel to the first output shaft and configured to transmit the power to the traveling driving shaft via the differential gear; a second driving shaft arranged in parallel to the first output shaft and configured by an inner shaft and an outer shaft including the inner shaft to be capable of relatively rotating; a first electric motor arranged coaxially with the inner shaft and connected to the inner shaft; a second electric motor arranged coaxially with the outer shaft and connected to the outer shaft; a first gear set configured by meshing a plurality of gears and configured to transmit the power between the first driving shaft and the inner shaft; a second gear set configured by meshing a plurality of gears and configured to transmit the power between the outer shaft and the first output shaft; a third gear set configured by meshing a plurality of gears and configured to transmit the power between the first driving shaft and the second output shaft; and a power connecting and disconnecting unit provided in the second output shaft and configured to connect and disconnect the power transmitted by the first driving shaft. A center distance between the second driving shaft and the second output shaft is set longer than a distance from the axial center of the second electric motor to the outermost circumference of a housing that houses the second electric motor.

Consequently, it is possible to increase a degree of freedom of design of a setting position of the power connecting and disconnecting device and a degree of freedom of design of a driving circuit such as a hydraulic route for actuating the power connecting and disconnecting device.

Therefore, for example, it is possible to provide the power connecting and disconnecting device further on the second electric motor side than the third gear set of the second output shaft and arrange the power connecting and disconnecting device and the second electric motor not to interfere with each other when viewed from an extending direction of the second output shaft. It is possible to form the power connecting and disconnecting device in a shape large in the axial direction of the second output shaft. It is possible to dispose an electric circuit, a hydraulic circuit, and the like for actuating the power connecting and disconnecting device in the extending direction of the second output shaft. This is advantageous in terms of layout.

BRIEF DESCRIPTION OF THE DRAWINGS

The present invention will become more fully understood from the detailed description hereinafter and the accompanying drawings which are given by way of illustration only, and thus, are not limitative of the present invention, and wherein.

DETAILED DESCRIPTION OF THE INVENTION

Embodiments of the present invention are explained below with reference to the drawings.

First Embodiment

Figure 1:
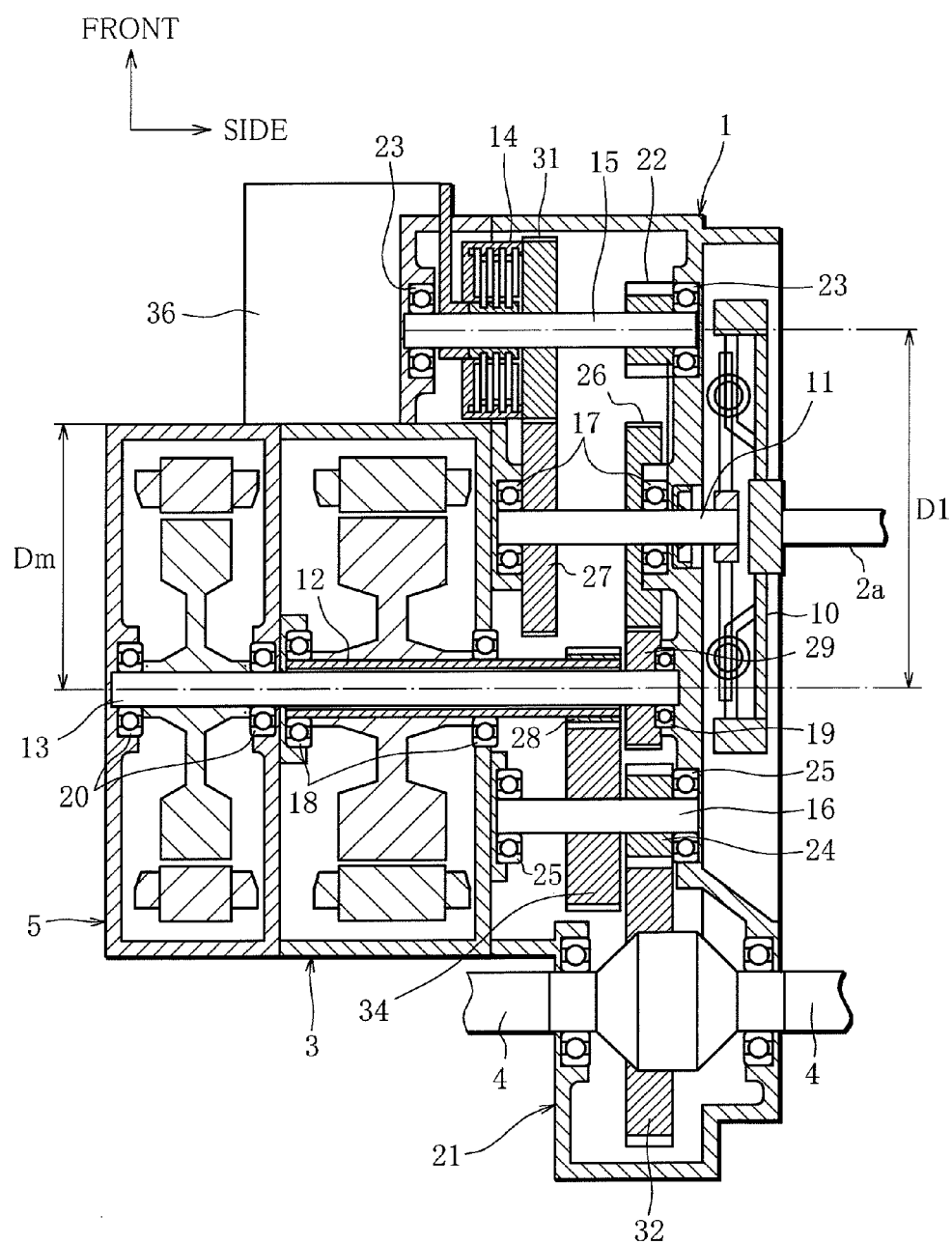
FIG. 1 is a schematic configuration diagram of a transaxle device according to a first embodiment of the present invention.
Figure 2:
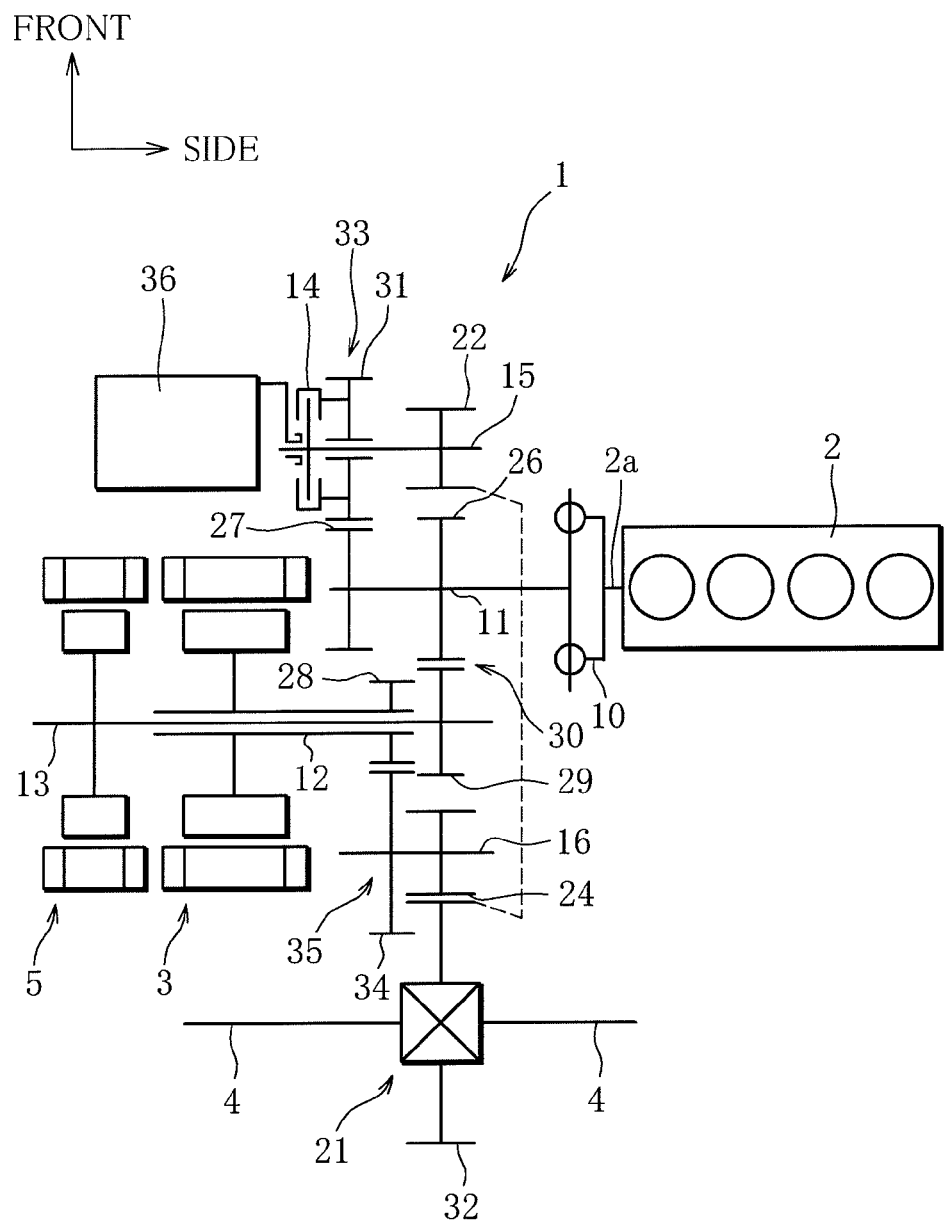
FIG. 2 is a schematic diagram of the transaxle device according to the first embodiment of the present invention.
Figure 3:
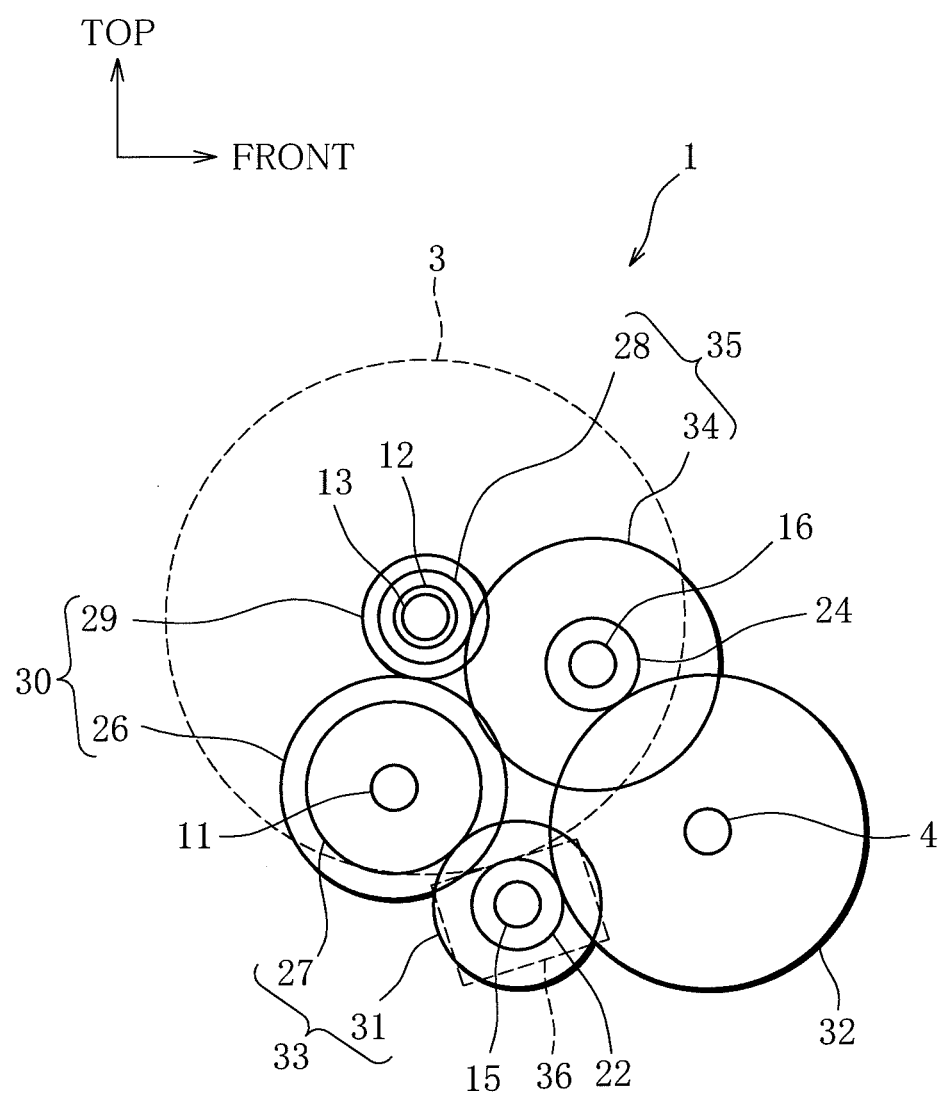
FIG. 3 is an explanatory diagram showing a meshing state of gears in the transaxle device according to the first embodiment of the present invention.

FIG. 1 is a schematic configuration diagram of a transaxle device according to a first embodiment of the present invention. FIG. 2 is a schematic diagram of the transaxle device according to the first embodiment of the present invention. FIG. 3 is an explanatory diagram showing a meshing state of gears in the transaxle device according to the first embodiment of the present invention. Note that, in FIGS. 1 to 3, the front indicates the front direction of a vehicle, the side indicates the width direction of the vehicle, and the top indicates the upward direction of the vehicle. That is, in FIGS. 1 and 2, the right side is the right direction of the vehicle and the left side is the left direction of the vehicle. FIG. 3 is a view from the side direction of the transaxle device. A broken line in FIG. 2 indicates that a first final gear 22 and a third final gear 32 explained below mesh with each other.

A transaxle device 1 according to the first embodiment of the present invention is adopted in a hybrid vehicle (hereinafter referred to as vehicle) in which an engine 2 and an electric motor 3 (a second electric motor) are placed sideways as traveling driving sources. The vehicle in this embodiment is a front-wheel drive vehicle, a so-called FF vehicle mounted with the engine 2 and the electric motor 3 in a front part of the vehicle to drive drive shafts 4 (traveling driving shafts), which are front axles.

As shown in FIGS. 1 to 3, in the vehicle according to the first embodiment, the engine 2 and the electric motor 3 are arranged to be spaced apart from each other in the left-right direction of the vehicle across the transaxle device 1. A generator (a first electric motor) 5 is provided adjacent to the electric motor 3 in the vehicle left direction. Note that the engine 2, the electric motor 3, the transaxle device 1, and the generator 5 configure a power plant of the vehicle and are integrally supported by a vehicle body.

The transaxle device 1 includes an engine shaft 11 (a first driving shaft) connected to a crankshaft 2a of the engine 2 via a drive plate 10, a motor shaft 12 (a second driving shaft, an outer shaft) driven by the electric motor 3, a generator shaft 13 (a second driving shaft, an inner shaft), which is a driving shaft for the generator 5, a clutch shaft (a second output shaft) 15 including a wet multiple disc clutch (a power connecting and disconnecting unit) 14, and an output shaft (a first output shaft) 16.

The engine shaft 11, the motor shaft 12, the generator shaft 13, the clutch shaft 15, and the output shaft 16 are arranged to extend in the width direction of the vehicle in parallel to one another.

The drive plate 10 is connected to the vehicle right end of the engine shaft 11. The engine shaft 11 is rotatably supported by a pair of bearings 17.

The motor shaft 12 is formed in a hollow shape. The motor shaft 12 is rotatably supported by a pair of bearings 18 at both ends.

The generator shaft 13 is arranged on the inside of the motor shaft 12 coaxially with the motor shaft 12 and to be relatively rotatable with the motor shaft 12. The generator shaft 13 is formed longer than the motor shaft 12. Both ends of the generator shaft 13 project further outward than the motor shaft 12. The generator shaft 13 is rotatably supported at both ends and the center by a plurality of (in this embodiment, three) bearings 19 and 20. The motor shaft 12 and the generator shaft 13 project from the transaxle device 1 respectively at vehicle left ends. The vicinity of the vehicle left end of the motor shaft 12 is connected to the electric motor 3. The vicinity of the vehicle left end of the generator shaft 13 is connected to the generator 5.

The transaxle device 1 includes a differential gear 21 that distributes power to the left and right drive shafts 4.

The clutch shaft 15 is configured to be capable of transmitting the power to the differential gear 21 via the first final gear 22 provided in the vicinity of the vehicle right end of the clutch shaft 15. The clutch shaft 15 is arranged in a position where a center distance D1 between the clutch shaft 15 and the motor shaft 12 is longer than a distance Dm from the axial center of the motor shaft 12 to the outermost circumference of a housing that houses the electric motor 3. Note that the clutch shaft 15 is rotatably supported by a pair of bearings 23.

The output shaft 16 is configured to be capable of transmitting the power to the differential gear 21 via the second final gear 24 provided in the vicinity of the vehicle right end of the output shaft 16. The output shaft 16 is rotatably supported by a pair of bearings 25.

In the engine shaft 11, a first fixed gear 26 and a second fixed gear 27 are arranged in order from the vehicle right direction (the engine 2 side). The first fixed gear 26 and the second fixed gear 27 are fixed to the engine shaft 11 and configured to rotate according to the rotation of the engine shaft 11.

A third fixed gear 28 is provided in the vicinity of the vehicle right end of the motor shaft 12. The third fixed gear 28 is fixed to the motor shaft 12 and configured to rotate together with the motor shaft 12.

A fourth fixed gear 29 is provided in the vicinity of the vehicle right end of the generator shaft 13. The fourth fixed gear 29 is fixed to the generator shaft 13 and configured to rotate together with the generator shaft 13. The fourth fixed gear 29 is arranged to align with the axial direction of the engine shaft 11 to mesh with the first fixed gear 26. Note that the first fixed gear 26 and the fourth fixed gear 29 form a first gear set 30. That is, the engine shaft 11 and the generator shaft 13 are configured to be capable of always transmitting the power via the first gear set 30 including the two gears 26 and 29, the number of meshes of which is 1.

In the clutch shaft 15, the first final gear 22, an idler gear 31, and the wet multiple disc clutch 14 are arranged in order from the vehicle right direction (the engine 2 side).

The first final gear 22 is fixed to the clutch shaft 15 and configured to rotate together with the clutch shaft 15. The first final gear 22 is arranged to align with the axial direction of the engine shaft 11 to mesh with the third final gear 32 included in the differential gear 21.

The idler gear 31 is supported to be rotatable with respect to the clutch shaft 15. The idler gear 31 is arranged to align with the axial direction of the engine shaft 11 to mesh with the second fixed gear 27. Note that the second fixed gear 27 and the idler gear 31 form a third gear set 33. That is, the engine shaft 11 and the clutch shaft 15 are configured to be capable of always transmitting the power via the third gear set 33 including the two gears 27 and 31, the number of meshes of which is 1.

The wet multiple disc clutch 14 is a clutch that connects and disconnects transmission of power, which is input to the idler gear 31 from the engine shaft 11, to the clutch shaft 15. The actuation of the wet multiple disc clutch 14 is controlled by a piston (equivalent to an actuating mechanism of the present invention) 36. The wet multiple disc clutch 14 is arranged to overlap the electric motor 3 in the axial direction of the engine shaft 11.

The piston 36 is arranged in the outer circumferential section of a housing, which houses the electric motor 3, to overlap the electric motor 3 in the axial direction of the engine shaft 11. The piston 36 controls the actuation of the wet multiple disc clutch 14 with hydraulic pressure.

In the output shaft 16, the second final gear 24 and a fifth fixed gear 34 are arranged in order from the vehicle right direction (the engine 2 side). The second final gear 24 and the fifth fixed gear 34 are fixed to the output shaft 16 and configured to rotate together with the output shaft 16.

The second final gear 24 is arranged to align with the axial direction of the engine shaft 11 to mesh with the third final gear 32 included in the differential gear 21.

The fifth fixed gear 34 is arranged to align with the axial direction of the engine shaft 11 to mesh with the third fixed gear 28. Note that the third fixed gear 28 and the fifth fixed gear 34 form a second gear set 35. That is, the motor shaft 12 and the output shaft 16 are configured to be capable of always transmitting the power via the second gear set 35 including the two gears 28 and 34, the number of meshes of which is 1. Note that the number of meshes represents the number of times a rotating direction of a plurality of gears is switched when the gears transmit power and does not represents the number of times teeth of the gears come into contact with each other. Note that the second gear set 35 and the third gear set 33 are arranged in the axial direction of the engine shaft 11 not to overlap each other.

With such a configuration, in the transaxle device 1 according to the first embodiment of the present invention, the engine shaft 11 and the generator shaft 13 are configured to be capable of always transmitting the power via the first gear set 30. The motor shaft 12 and the output shaft 16 are configured to be capable of always transmitting the power via the second gear set 35. The wet multiple disc clutch 14 is subjected to actuation control to prevent the clutch shaft 15 and the idler gear 31 from being connected. Electric power is supplied from a not-shown battery mounted on the vehicle to drive the electric motor 3. Consequently, it is possible to realize an EV traveling mode for performing traveling driving with the electric motor 3. Note that, in this case, the engine 2 is driven according to an increase in requested power of the electric motor 3 and a decrease in a charging ratio of the battery. Consequently, it is possible to drive the generator 5 with the engine 2 and generate electric power. It is possible to supply electric power to the electric motor 3 and charge the battery. Therefore, it is possible to realize a series traveling mode.

When the wet multiple disc clutch 14 is subjected to actuation control and the clutch shaft 15 and the idler gear 31 are connected, the engine shaft 11 and the clutch shaft 15 can transmit the power via the third gear set 33. Consequently, it is possible to realize an engine direct-connection mode in which the traveling driving is performed by the engine 2. In this case, by driving the electric motor 3, it is possible to realize a parallel traveling mode in which the power is transmitted from the electric motor 3 to the output shaft 16 and the traveling driving is performed.

In this way, in the transaxle device 1 according to the first embodiment of the present invention, the center distance D1 between the motor shaft 12 or the generator shaft 13 and the clutch shaft 15 including the wet multiple disc clutch 14 is set longer than the distance Dm from the axial center of the electric motor 3, that is, the axial center of the motor shaft 12 to the outermost circumference of the housing that houses the electric motor 3. Consequently, it is possible to increase a degree of freedom of design of a setting position of the wet multiple disc clutch 14 and a degree of freedom of design of the piston 36.

Therefore, it is possible to provide the wet multiple disc clutch 14 further on the electric motor 3 side than the third gear set 33 of the clutch shaft 15 and arrange the wet multiple disc clutch 14 and the electric motor 3 not to interfere with each other when viewed from the extending direction of the engine shaft 11. It is possible to form the wet multiple disc clutch 14 in a shape large in the axial direction of the clutch shaft 15. It is possible to dispose the piston 36, which actuates the wet multiple disc clutch 14, in the extending direction of the clutch shaft 15. This is advantageous in terms of layout.

It is possible to arrange the wet multiple disc clutch 14 further on the electric motor 3 side than the third gear set 33 of the clutch shaft 15 and arrange the wet multiple disc clutch 14 and the electric motor 3 in the axial direction of the engine shaft 11 to overlap each other. It is possible to reduce the length of the transaxle device 1 in the axial direction of the engine shaft 11.

Therefore, it is possible to improve the mountability on the vehicle.

The piston 36, which actuates the wet multiple disc clutch 14, is arranged in the outer circumferential section of the housing, which houses the electric motor 3, to overlap the electric motor 3 in the axial direction of the engine shaft 11. Consequently, it is possible to suppress an increase in the length of the transaxle device 1 in the axial direction of the engine shaft 11.

In particular, the generator 5 and the electric motor 3 are arranged adjacent to each other. Therefore, it is also possible to arrange the piston 36 in the outer circumference section of the housing, which houses the generator 5, to overlap the generator 5 in the axial direction of the engine shaft 11. It is possible to suppress an increase in the length of the transaxle device 1 in the axial direction of the engine shaft 11 even if the piston 36 is large.

Since the second gear set 35 and the third gear set 33 are arranged in the axial direction of the engine shaft 11 not to overlap each other, the second gear set 35 and the third gear set 33 do not interfere with each other. Therefore, it is possible to increase a setting range of gear ratios of the respective gear sets.

The number of meshes of the second gear set 35 is set to an odd number to set a rotating direction of the electric motor 3 same as a rotating direction of the drive shafts 4 (an engine rotating direction). A total of the number of meshes of the first gear set 30 and the number of meshes of the third gear set 33 is set to an even number to set a rotating direction of the generator 5 opposite to the rotating direction of the drive shafts 4 (the engine rotating direction). That is, the rotating direction of the electric motor 3 and the rotating direction of the generator 5 are set opposite to each other. Consequently, vibration of the electric motor 3 and vibration of the generator 5 are offset each other. It is possible to reduce vibration in the entire power plant and the entire vehicle.

Second Embodiment

A transaxle device according to a second embodiment of the present invention is explained below.

The second embodiment is different from the first embodiment in the positions of the second fixed gear 27 and the idler gear 31 of a transaxle device 1' in the axial direction of the engine shaft 11 and different in that a mechanism for connecting and disconnecting transmission of power, which is input to the idler gear 31 from the engine shaft 11, to the clutch shaft 15 is a synchronizer (a power connecting and disconnecting unit, a synchronous meshing device) 14' and the piston 36 is changed to an actuator (equivalent to an actuating mechanism of the present invention) 36' that controls actuation of the synchronizer 14'. The differences from the first embodiment are explained below.

Figure 4:
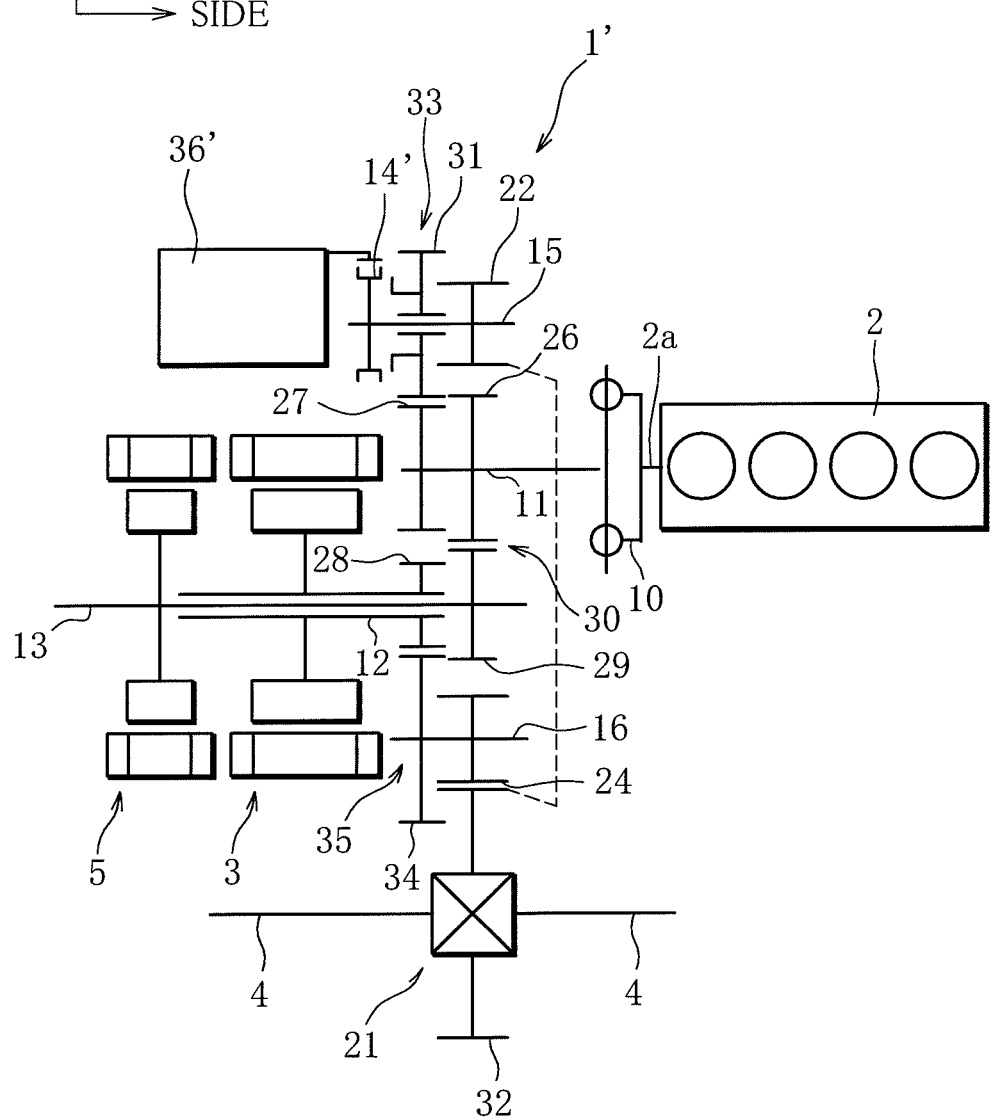
FIG. 4 is a schematic diagram of a transaxle device according to a second embodiment of the present invention.

FIG. 4 is a schematic diagram of the transaxle device according to the second embodiment of the present invention. Note that, in FIG. 4, the front indicates the front direction of a vehicle and the side indicates the width direction of the vehicle. That is, in FIG. 4, the right side is the right direction of the vehicle and the left side is the left direction of the vehicle. A broken line in FIG. 4 indicates that the first final gear 22 and the third final gear 32 mesh with each other.

The first fixed gear 26 and the second fixed gear 27 are arranged in the engine shaft 11 in order from the vehicle right direction (the engine 2 side). The first fixed gear 26 and the second fixed gear 27 are fixed to the engine shaft 11 and configured to rotate according to the rotation of the engine shaft 11.

In the clutch shaft 15, the first final gear 22, the idler gear 31, and a synchronizer 14' are arranged in order from the vehicle right direction (the engine 2 side).

The first final gear 22 is fixed to the clutch shaft 15 and configured to rotate together with the clutch shaft 15. The first final gear 22 is arranged to align with the axial direction of the engine shaft 11 to mesh with the third final gear 32 included in the differential gear 21.

The idler gear 31 is supported to be rotatable with respect to the clutch shaft 15. The idler gear 31 is arranged to align with the axial direction of the engine shaft 11 to mesh with the second fixed gear 27. Note that the second fixed gear 27 and the idler gear 31 form the third gear set 33. That is, the engine shaft 11 and the clutch shaft 15 are configured to be capable of always transmitting the power via the third gear set 33 including the two gears 27 and 31, the number of meshes of which is 1. The third gear set 33 is arranged to overlap the second gear set 35 in the axial direction of the engine shaft 11.

The synchronizer 14' is a device that connects and disconnects transmission of power, which is input to the idler gear 31 from the engine shaft 11, to the clutch shaft 15. The actuation of the synchronizer 14' is controlled by the actuator 36'. The synchronizer 14' is arranged to overlap the electric motor 3 in the axial direction of the engine shaft 11.

The actuator 36' is arranged in the outer circumferential section of the housing, which houses the electric motor 3, to overlap the electric motor 3 in the axial direction of the engine shaft 11. The actuator 36' controls the actuation of the synchronizer 14'.

With the configuration explained above, in the transaxle device 1' according to the second embodiment of the present invention, the engine shaft 11 and the generator shaft 13 are configured to be capable of always transmitting the power via the first gear set 30. The motor shaft 12 and the output shaft 16 are configured to be capable of always transmitting the power via the second gear set 35. The synchronizer 14' is subjected to actuation control to prevent the clutch shaft 15 and the idler gear 31 from being connected. As in the first embodiment, electric power is supplied from a not-shown battery mounted on the vehicle to drive the electric motor 3. Consequently, it is possible to realize an EV traveling mode for performing traveling driving with the electric motor 3. Note that, in this case, the engine 2 is driven according to an increase in requested power of the electric motor 3 and a decrease in a charging ratio of the battery. Consequently, it is possible to drive the generator 5 with the engine 2 and generate electric power. It is possible to supply electric power to the electric motor 3 and charge the battery. Therefore, it is possible to realize a series traveling mode.

When the synchronizer 14' is subjected to actuation control and the clutch shaft 15 and the idler gear 31 are connected, the engine shaft 11 and the clutch shaft 15 can transmit the power via the third gear set 33. Consequently, it is possible to realize an engine direct-connection mode in which the traveling driving is performed by the engine 2. In this case, by driving the electric motor 3, it is possible to realize a parallel traveling mode in which the power is transmitted from the electric motor 3 to the output shaft 16 and the traveling driving is performed.

In this way, in the transaxle device 1' according to the second embodiment of the present invention, the second gear set 35 and the third gear set 33 are arranged to overlap each other in the axial direction of the engine shaft 11. Therefore, it is likely that interference occurs depending on gear ratios of the second gear set 35 and the third gear set 33. The gear ratios of the second gear set 35 and the third gear set 33 are limited. However, it is possible to reduce the length in the axial direction of the engine shaft 11 and reduce the length of the transaxle device 1' in the axial direction of the engine shaft 11.

Therefore, it is possible to further improve the mountability on the vehicle.

The connection and disconnection of the transmission of the power, which is input to the idler gear 31 from the engine shaft 11, to the clutch shaft 15 is performed by the synchronizer 14'. Consequently, although, for example, in the wet multiple disc clutch 14 in the first embodiment, sliding resistance occurs because oil is interposed among clutch discs, the sliding resistance due to the interposition of the oil does not occur in the synchronizer 14'. Therefore, during traveling by only the electric motor 3, it is possible to reduce friction and reduce power consumption of a battery mounted on the vehicle. In the engine direct-connection mode or the parallel traveling mode for transmitting a driving force of the engine 2 to the drive shafts 4, in the first embodiment, a force for pressing the wet multiple disc clutch 14 against the idler gear 31 is necessary. However, when the synchronizer 14' is used, the force for pressing the wet multiple disc clutch 14 is unnecessary. Therefore, energy efficiency of the entire vehicle is improved. Further, when the synchronizer 14' is used, it is possible to smoothly perform connection of the third gear set 33 and the clutch shaft 15 and configure the transaxle device 1' compact.

As in the first embodiment, the generator 5 and the electric motor 3 are arranged adjacent to each other. Therefore, it is also possible to arrange the actuator 36' in the outer circumference section of the housing, which houses the generator 5, to overlap the generator 5 in the axial direction of the engine shaft 11. It is possible to suppress an increase in the length of the transaxle device 1' in the axial direction of the engine shaft 11 even if the actuator 36' is large.

The embodiments of the present invention are explained above. However, modes of the present invention are not limited to the embodiments.

In the first embodiment, the connection and disconnection of the transmission of the power, which is input to the idler gear 31 from the engine shaft 11, is performed by the wet multiple disc clutch 14. However, the connection and disconnection of the transmission of the power is not limited to this. The synchronizer 14' used in the second embodiment or a dog clutch may be used. As in the second embodiment, the sliding resistance due to the interposition of the oil does not occur. Therefore, during traveling by only the electric motor 3, it is possible to reduce friction and reduce power consumption of a battery mounted on the vehicle.

In the second embodiment, the connection and disconnection of the transmission of the power, which is input to the idler gear 31 from the engine shaft 11, is performed by the synchronizer 14'. However, the connection and disconnection of the transmission of the power is not limited to this. A dog clutch may be used.

What is claimed is:

1. A transaxle device comprising:
    a first driving shaft arranged coaxially with a crankshaft of an engine, which is mounted on a vehicle, and connected to the crankshaft;
    a first output shaft arranged in parallel to the first driving shaft and configured to transmit power to a traveling driving shaft of the vehicle via a differential gear;
    a second output shaft arranged in parallel to the first output shaft and configured to transmit the power to the traveling driving shaft via the differential gear;
    a second driving shaft arranged in parallel to the first output shaft and configured by an inner shaft and an outer shaft including the inner shaft to be capable of relatively rotating;
    a first electric motor arranged coaxially with the inner shaft and connected to the inner shaft;
    a second electric motor arranged coaxially with the outer shaft and connected to the outer shaft;
    a first gear set configured by meshing a plurality of gears and configured to transmit the power between the first driving shaft and the inner shaft;
    a second gear set configured by meshing a plurality of gears and configured to transmit the power between the outer shaft and the first output shaft;
    a third gear set configured by meshing a plurality of gears and configured to transmit the power between the first driving shaft and the second output shaft; and
    a power connecting and disconnecting device provided in the second output shaft and configured to connect and disconnect the power transmitted by the first driving shaft, wherein
    a center distance between the second driving shaft and the second output shaft is set longer than a distance from an axial center of the second electric motor to an outermost circumference of a housing that houses the second electric motor.

2. The transaxle device according to claim 1, wherein
    the power connecting and disconnecting device is provided further on the second electric motor side than the third gear set of the second output shaft, and
    the power connecting and disconnecting device and the second electric motor are arranged to overlap each other when viewed from a direction perpendicular to the second output shaft.

3. The transaxle device according to claim 2, wherein the second gear set and the third gear set are arranged to overlap each other when viewed from a direction perpendicular to the first driving shaft.

4. The transaxle device according to claim 3, wherein the power connecting and disconnecting device is a synchronous meshing device.

5. The transaxle device according to claim 4, further comprising an actuating mechanism configured to actuate the power connecting and disconnecting device, wherein
    the actuating mechanism is disposed at least in an outer circumferential section of the housing that houses the second electric motor.

6. The transaxle device according to claim 5, wherein the first electric motor and the second electric motor are arranged adjacent to each other.

7. The transaxle device according to claim 3, further comprising an actuating mechanism configured to actuate the power connecting and disconnecting device, wherein
    the actuating mechanism is disposed at least in an outer circumferential section of the housing that houses the second electric motor.

8. The transaxle device according to claim 7, wherein the first electric motor and the second electric motor are arranged adjacent to each other.

9. The transaxle device according to claim 2, further comprising an actuating mechanism configured to actuate the power connecting and disconnecting device, wherein
    the actuating mechanism is disposed at least in an outer circumferential section of the housing that houses the second electric motor.

10. The transaxle device according to claim 9, wherein the first electric motor and the second electric motor are arranged adjacent to each other.

11. The transaxle device according to claim 1, wherein the second gear set and the third gear set are arranged to overlap each other when viewed from a direction perpendicular to the first driving shaft.

12. The transaxle device according to claim 11, further comprising an actuating mechanism configured to actuate the power connecting and disconnecting device, wherein
    the actuating mechanism is disposed at least in an outer circumferential section of the housing that houses the second electric motor.

13. The transaxle device according to claim 12, wherein the first electric motor and the second electric motor are arranged adjacent to each other.

14. The transaxle device according to claim 1, wherein the power connecting and disconnecting device is a synchronous meshing device.

15. The transaxle device according to claim 14, further comprising an actuating mechanism configured to actuate the power connecting and disconnecting device, wherein
    the actuating mechanism is disposed at least in an outer circumferential section of the housing that houses the second electric motor.

16. The transaxle device according to claim 15, wherein the first electric motor and the second electric motor are arranged adjacent to each other.

17. The transaxle device according to claim 1, further comprising an actuating mechanism configured to actuate the power connecting and disconnecting device, wherein
    the actuating mechanism is disposed at least in an outer circumferential section of the housing that houses the second electric motor.

18. The transaxle device according to claim 17, wherein the first electric motor and the second electric motor are arranged adjacent to each other.

19. The transaxle device according to claim 1, wherein
    a number of meshes of the gears forming the second gear set is an odd number, and
    a total of a number of meshes of the gears forming the first gear set and a number of meshes of the gears forming the third gear set is an even number.

20. The transaxle device according to claim 1, wherein
    a number of meshes of the gears forming the second gear set is an odd number, and
    a total of a number of meshes of the gears forming the first gear set and a number of meshes of the gears forming the third gear set is an even number.

* * * * *